United States Patent
Hopkins

(10) Patent No.: US 7,512,800 B2
(45) Date of Patent: Mar. 31, 2009

(54) KEY MANAGEMENT TECHNIQUE FOR ESTABLISHING A SECURE CHANNEL

(75) Inventor: W. Dale Hopkins, Georgetown, KY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 716 days.

(21) Appl. No.: 10/772,065

(22) Filed: Feb. 3, 2004

(65) Prior Publication Data

US 2005/0172137 A1   Aug. 4, 2005

(51) Int. Cl.
H04L 9/12 (2006.01)
H04L 9/16 (2006.01)
H04L 9/28 (2006.01)
H04L 9/30 (2006.01)
H04K 1/00 (2006.01)
G06F 7/04 (2006.01)
G06F 15/16 (2006.01)
H04L 9/32 (2006.01)

(52) U.S. Cl. .............. 713/172; 713/159; 713/184; 713/185; 726/9; 726/20; 726/28; 380/30; 705/65; 705/66; 705/67; 705/72

(58) Field of Classification Search .............. 713/159, 713/172, 184, 185; 726/9, 20, 28; 380/30; 705/65, 66, 67, 72

See application file for complete search history.

(56) References Cited

U.S. PATENT DOCUMENTS

| | | | |
|---|---|---|---|
| 4,193,131 A | 3/1980 | Lennon et al. | |
| 4,223,403 A | 9/1980 | Konheim et al. | |
| 4,288,659 A * | 9/1981 | Atalla | 380/281 |
| 4,500,750 A | 2/1985 | Elander et al. | |
| 5,214,698 A | 5/1993 | Smith, Sr. et al. | |
| 5,694,471 A * | 12/1997 | Chen et al. | 705/76 |
| 6,105,008 A * | 8/2000 | Davis et al. | 705/41 |
| 6,990,471 B1 * | 1/2006 | Rajaram | 705/64 |
| 7,240,034 B1 * | 7/2007 | Remery et al. | 705/67 |
| 2001/0001155 A1 | 5/2001 | Smith et al. | |
| 2003/0076960 A1 | 4/2003 | Chandersekaran et al. | |

OTHER PUBLICATIONS

Chang, C. et al. "Remote passowrd authentication with smart cards", May 1991 IEE.*

Ohta, K. "Efficient Identification and Signature Schemes", Jan. 1998.*

* cited by examiner

*Primary Examiner*—Michael J Simitoski

(57) ABSTRACT

A key management technique establishes a secure channel through an indeterminate number of nodes in a network. The technique comprises enrolling a smart card with a unique key per smart card. The unique key is derived from a private key that is assigned and distinctive to systems and a card base of a card issuer. An enrolled smart card contains a stored public entity-identifier and the secret unique key. The technique further comprises transacting at a point of entry to the network. The transaction creates a PIN encryption key derived from the smart card unique key and a transaction identifier that uniquely identifies the point of entry and transaction sequence number. The technique also comprises communicating the PIN encryption key point-to-point in encrypted form through a plurality of nodes in the network, and recovering the PIN at a card issuer server from the PIN encryption key using the card issuer private key.

28 Claims, 5 Drawing Sheets

KEY MANAGEMENT TECHNIQUE FOR ESTABLISHING A SECURE CHANNEL

BACKGROUND OF THE INVENTION

Each day in the United States alone over 100 million transactions aggregating $5 Billion are authorized and initiated by cardholders at over 400,000 Automated Teller Machines (ATMs) and seven million Point-of-Sale (POS) terminals. Securing the massive daily financial flow against fraud and loss relies upon protecting and verifying cardholder Personal Identification Numbers (PINs) using methods, structures, and cryptographic algorithms originating over twenty-five years ago.

Data security systems, such as financial systems, use security techniques and systems originating in the early 1980s that were based on technologies created in the late 1970s. Computational power, cryptanalytic knowledge, breadth of targets, and creative ingenuity accessible to potential attackers have grown dramatically since origination of the systems, while defensive technologies have scarcely evolved.

The Personal Identification Number (PIN) is a basic construct for establishing identity and authorizing consumer financial transactions.

In current technology, a PIN transmitted through a network frequently passes through multiple nodes in several transaction zones. The PIN is translated from one encryption under one key to encryption under another key as the transaction passes from each zone and/or node to the next. If security is broken at any of the PIN translation points, or where some other cryptographic process takes place, PINs can be compromised.

Currently PINs are encrypted at a point-of-entry and sent with other transaction data to an acquiring host. The acquirer passes the transaction data to a financial switch that, in turn, forwards the transaction to a card issuer server. Separate keys are maintained at each zone for every adjoining node and PINS are translated—decrypted and re-encrypted—by hardware security modules at each hop. The system is complex and fragile with respect to security.

SUMMARY

What is desired is a key management system that operates through multiple locations in a network to eliminate PIN translation operations at intervening points.

In accordance with an embodiment of a key management technique for establishing a secure channel through an indeterminate number of nodes in a network. The technique comprises enrolling a smart card with a unique key per smart card. The unique key is derived from a private key that is assigned and distinctive to systems and a card base of a card issuer. An enrolled smart card contains a stored public entity-identifier and the secret unique key. The technique further comprises transacting at a point of entry to the network. The transaction creates a PIN encryption key derived from the smart card unique key and a transaction identifier that uniquely identifies the point of entry and transaction sequence number. The technique also comprises communicating the PIN encryption key point-to-point in encrypted form through a plurality of nodes in the network, and recovering the PIN at a card issuer server from the PIN encryption key using the card issuer private key.

BRIEF DESCRIPTION OF THE DRAWINGS

Embodiments of the invention relating to both structure and method of operation may best be understood by referring to the following description and accompanying drawings.

DETAILED DESCRIPTION

An end-to-end key management technique can be used to eliminate Personal Identification Number (PIN) translations including decryptions and encryptions at intermediate nodes in a transaction system. The end-to-end key management technique can be used in many applications. In a particular financial system application, end-to-end PIN encryption can be used in consumer-initiated Automated Teller Machine (ATM) and Point of Sale (POS) transactions. More generally, the end-to-end key management technique can be used in virtually any application in which establishment of a secure channel between any two servers or security devices is desired.

Figure 1:
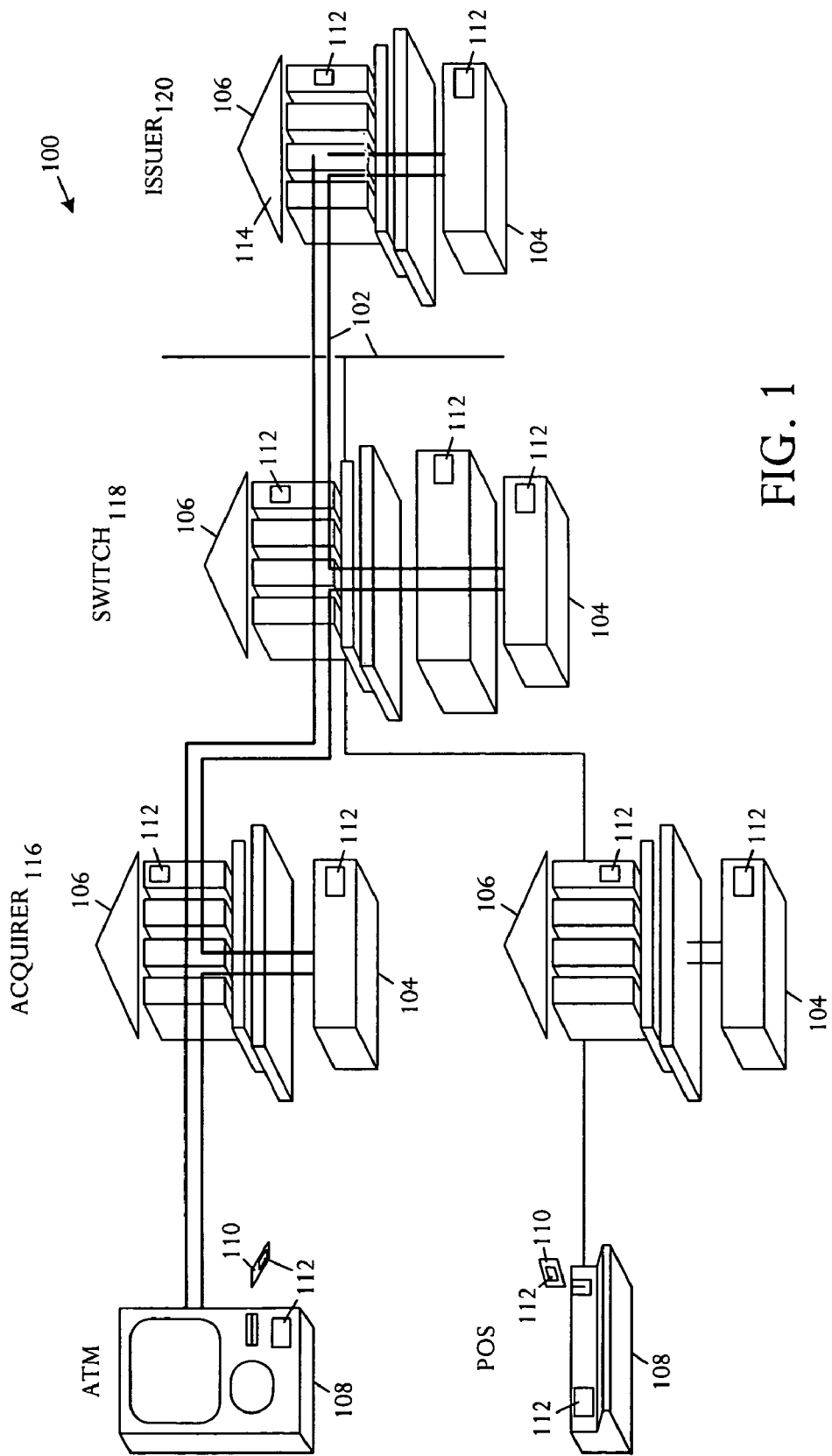
FIG. 1 is a schematic block diagram that illustrates an embodiment of a transaction system capable of implementing an end-to-end management technique.

Referring to FIG. 1, a schematic block diagram illustrates an embodiment of a transaction system 100 that is capable of implementing an end-to-end management technique that eliminates Personal Identification Number (PIN) translations in a PIN processing network 102. The translation system 100 comprises the network 102, a plurality of servers 104 and/or hosts 106 mutually coupling to the network 102, and a plurality of terminals 108 coupled to the servers 104 and/or hosts 106 via the network 102. The terminals 108 are available for performing various types of transactions. The translation system 100 further comprises a plurality of smart cards 110 enrolled in the transaction system 100 that is capable of being inserted into the terminals 108 for performing transactions via the servers 104.

The transaction system 100 further comprises a plurality of processors 112 distributed among the smart cards 110, the servers 104, the hosts 106, and/or the terminals 108. The processors 112, either individually or in selected combinations, are capable of establishing a secure channel through an indeterminate number of nodes in the network 100 by creating, communicating, and decrypting a PIN encryption key. The PIN encryption key is derived from a smart card unique key and a transaction identifier that uniquely identifies a point of entry terminal and transaction sequence number. The smart card unique key is derived from a private key that is assigned and distinctive to systems and a card base of a card issuer 114.

The servers 104, hosts 106, terminals 108, smart cards 110, and processors 112 are numbered generically for simplicity of illustration and to avoid unwieldy numeration in the text, although various different types of devices and components may be and typically are implemented in a particular transaction system 100. For example, a processor 112 within a smart card 100 is typically very different from a processor 112 in a terminal 108, server 104, or host 106.

The transaction system 100 is a key management system that operates end-to-end between an issuer-enrolled smart card 110 at any point of entry 108 to a network, such as a financial network, and a server 104 at an issuer financial institution 114. In an application of Personal Identification Number (PIN) processing, the technique eliminates PIN translation operations in security modules at intervening points or nodes. In the illustrative transaction system 100 that uses end-to-end management, any compromise to security at any point or node cannot compromise entity PINs or transactions.

The illustrative key management technique is implemented between a smart card 110 used at a point of entry 108, and a server 104 in the financial network 102. The server 104 is typically located at the card issuing financial institution 114. When applied to PIN processing networks, the technique can eliminate usage of PIN translation functions in security modules at intermediate host systems. The illustrative key management technique is a true end-to-end key management system so that compromise of any intermediate node does not compromise customer PINs.

Personal Identification Numbers (PINs) are encrypted at the point of entry 108 and transmitted along with other transaction data to an acquiring host, a host 106 in an acquiring zone 116. The acquiring host passes the transaction data to a financial switch in a switch zone 118, which in turn sends the transaction to the card issuing server 104 in a card issuer zone 120. In various conditions and circumstances, the transaction may pass through more or fewer nodes in one or more "hops". The hops through the network 102 pass through what are commonly called zones. A financial system generally has at least three zones including the acquirer zone 116, an acquirer to switch zone 118, and a switch to card issuer zone 120.

Figure 2:
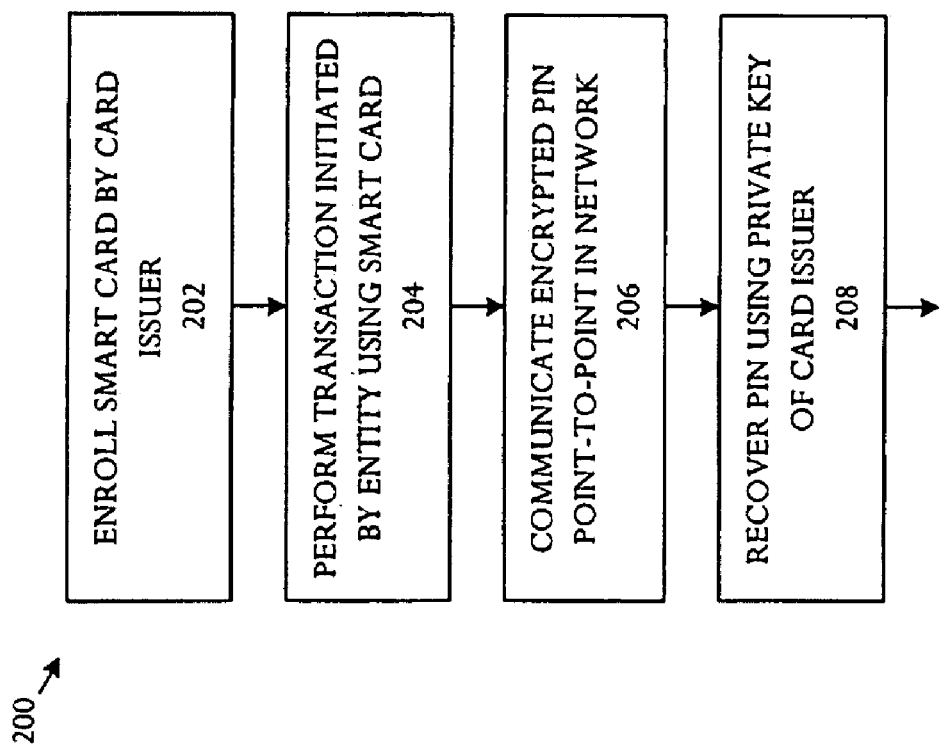
FIG. 2 is a flow chart depicting an embodiment of a method for establishing a secure channel through an indeterminate number of nodes in a network.

Referring to FIG. 2, a flow chart depicts an embodiment of a method for establishing a secure channel through an indeterminate number of nodes in a network 200. The method comprises enrolling 202 a smart card with a unique key per smart card. The unique key is derived from a private key that is assigned and distinctive to systems and a card base of a card issuer. An enrolled smart card contains a stored public entity-identifier and the secret unique key. The method further comprises transacting 204 at a point of entry to the network. In a particular example, a customer using a smart card initiates a transaction at a terminal such as an Automated Teller Machine (ATM) or a Point of Sale (POS) terminal. The transaction creates a PIN encryption key derived from the smart card unique key, and a transaction identifier that uniquely identifies the point of entry and transaction sequence number. The encryption key is communicated point-to-point 206 in encrypted form through a plurality of nodes in the network. A server for a card issuer recovers 208 the PIN from the PIN encryption key using the private key of the card issuer. The card issuer host system performs computations to verify a received transaction.

In a particular embodiment of the transaction system, a card issuer may utilize a system-wide RSA (Rivest, Shamir, and Adelman Public Key Cryptosystem)-type system that can be described by parameters including a public exponent e in the RSA system, a private exponent d in the RSA system that is known only to the defining enrollment system, and a modulus N for the RSA system. The modulus N is generally a product of two or more large prime numbers. Unlike most typical public key systems, the public key values (e, N) for the illustrative transaction system are defined and used only inside the systems and smart card base of the issuer. The public key values e and N are not used and need not be shared with other parts of a network, such as a financial network, including other acquirers and switches.

During smart card enrollment and personalization, the issuer uses the RSA private key d, which belongs exclusively to the issuer, to create a unique key per smart card. In turn, the unique key per smart card is used to create a unique key per transaction for every transaction originating at the smart card. The unique key per smart card u is derived from the RSA secret key d of the issuer according to an equation of the form:

$$u = x^d (\mod N).$$

In the illustrative equation, variable x is an entity-identifier that identifies the smart card and the entity. In a particular financial system example, the variable x can be a Primary Account Number (PAN) for a customer. The entity-identifier is a non-secret and unique number that identifies the particular smart card or the particular customer or consumer. Although the number x is not a secret, the unique key u is also derived from the secret issuer private exponent d, so that unique key u is a secret. The secret unique key per smart card u is stored securely in the smart card with non-secret values including the entity-identifier x, the public exponent key value e, and the public modulus N.

The smart card contains the public entity-identifier x and the secret unique key u that are exclusive to the particular smart card. An entity, such as a customer, enters a Personal Identification Number (PIN) into an entity-activated terminal, for example an Automated Teller Machine (ATM) or Point of Sale (POS) terminal, and the terminal passes the PIN to the smart card. Information for financial transactions includes a unique transaction identifier, a transaction sequence number (TSN), which specifies the particular terminal and contains a sequence number for each transaction originating at the terminal. The transaction sequence number TSN increments after each transaction. For purposes of auditing, the unique TSN is communicated through the network with each transaction. The smart card computes a keying code K using an equation of the form:

$$K = u \cdot TSN^H (\mod N),$$

where H is a hash of typical transaction data elements. The keying code K is a secret value on the basis that K is a function of the secret unique key u. The smart card uses the keying code K as keying material, hashing the keying code K to form a 112-bit triple-Data Encryption Standard (3-DES) or Advanced Encryption Standard (AES) PIN encryption key KPE.

The smart card hashes the keying code K to form the PIN encryption key KPE according to an equation of the form:

$$KPE = h(K),$$

where h( ) is a hashing algorithm. Hashing is a technique for reducing size of a data string. The individual data items to be stored are associated with a key. The hash function is applied to the key of the item and a resulting hash value is used as an index to select one of a number of hash buckets in a hash table.

The hash table contains pointers to the original items.

In some embodiments or in some conditions, the keying code K can be padded with transaction-related data prior to the hash operation. Encryption key KPE can be used in the triple-DES or AES algorithm to encrypt the PIN. Encryption using the KPE can be the conventional encryption operations under the 3-DES and AES definitions for encrypting Personal Identification Numbers (PINs).

Several notable conditions or properties occur as a result of the illustrative procedure. The conditions manifest an increase in data security. An adversary cannot derive the PIN encryption key KPE because the unique secret key u is unknown to the adversary.

The PIN encryption key KPE is unique for each transaction.

Anyone, including an adversary, can construct a cryptogram $C=E_e[K]$, the keying material K encrypted using public RSA key e. The potential adversary, while capable of constructing the finished cryptogram, cannot construct the cryptogram by encrypting K using the exponent e. The illustrative procedure is secure against the adversary because the keying code K cannot be recovered without knowledge of the secret private exponent d.

The card enrollment server is the only entity in the network that possesses the secret private exponent d. Therefore, the card issuer, like every other entity, is capable of constructing the cryptogram C. However, in addition, the card issuer is the only entity with a capability to decrypt the cryptogram C.

The notable properties or conditions can be exploited by the card issuer upon receipt of a transaction through the network to recover the Personal Identification Number (PIN) from the PIN encryption key KPE.

A card-issuing host computes the hash H of the received transaction data. The host computes an RSA (Rivest, Shamir, and Adelman Public Key Cryptosystem) system encryption t of the transaction sequence identifier TSN and a cryptogram quantity C using respective equations of the form:

$$t=TSN^e (\text{mod } N), \text{ and}$$

$$C=x \cdot t^H (\text{mode } N).$$

The quantity C is computed using public data, since the entity-identifier x is part of the transaction and RSA encryption value t is simply the RSA encryption of the transaction sequence identifier TSN. Since the transaction sequence identifier TSN is public data, anyone including the host can computer the quantity C.

The issuer host decrypts the quantity C using the private key value d, which is a secret RSA private key, known only to the issuer. Decryption proceeds according to an equation of the form:

$$K=C^d (\text{mod } N).$$

The host uses the relationship that the PIN encryption key KPE is equal to the hash of keying code h(K) to decrypt the PIN.

The PIN encryption key KPE obtained by decryption at the card issuer host is the same as the PIN encryption key KPE created at the smart card during the original transaction as shown by the following relationship. According to the computations at the smart card:

$$K=u \cdot TSN^H (\text{mod } N) \text{ and } C=x \cdot t^H (\text{mod } N).$$

Computing $K^e$ and substituting for u, as follows:

$$K^e = u^e \cdot TSN^{eH} (\text{mod } N),$$
$$= x^{ed} \cdot t^H (\text{mod } N),$$
$$= x \cdot t^H (\text{mod } N),$$
$$= C.$$

The proof demonstrates that $K=C^d$ (mode N) so that the PIN encryption keys KPEs at the host and at the smart card are identical.

One characteristic of the illustrative key management technique is that the keying code K is created at the smart card from the transaction sequence number TSN. The transaction sequence number TSN can be very large to account for a large number of transactions at the terminal. Accordingly, in an alternative mode of operation, the transaction system can utilize a second option with strong security features but does not result in the message from the terminal being increased in size by the transition sequence number. In the alternative embodiment, the RSA encryption t value is not computed from the transaction sequence number TSN, but rather is computed based on a random number generated by the smart card. The smart card generates a random number r, uses the random number r to encrypt transaction data for a single transaction, and then erases the random number r from the card. The illustrative technique has a property that can be termed "perfect forward secrecy" on the basis that, if at any time the persistent secrets are compromised, no prior transactions are jeopardized.

In the perfect forward secrecy option, the smart card is initialized in the manner described hereinbefore using the secret key u, the entity-identifier x, the RSA system public exponent e, and the RSA system modulus N. For an on-line transaction, the smart card generates a random number r that is secret and used only for the current transaction, and thereafter erased. The smart card then computes an RSA system encryption value t according to an equation of the form:

$$t=r^e (\text{mod } N).$$

The smart card next computes the hash H of common public transaction data, and then computes the keying code K and PIN encryption key KPE according to respective equations of the form:

$$K=u \cdot r^H (\text{mod } N), \text{ and}$$

$$KPE=h(K),$$

where H is a hash of transaction data elements.

The smart card sends a value $E_{KPE}[PIN]$ and the RSA system encryption value t through the network. The smart card then erases the random number r after the transaction. The value $E_{KPE}[PIN]$ and the RSA system encryption value t pass through one or more nodes in the network.

When the message reaches a destination at the card issuer host, the host receives the data and computes the hash H of the transaction data from the encrypted PIN data and the RSA system encryption value t. The host computes a cryptogram quantity C using public data according to an equation of the form:

$$C=x \cdot t^H (\text{mode } N),$$

and decrypts the cryptogram quantity C using the private key value d that is exclusive to the card issuer system and card base. The host decrypts the cryptogram quantity C according to an equation of the form:

$$K=C^d \pmod N.$$

The host uses the PIN encryption key KPE to decrypt the PIN. Accordingly, the PIN encryption key KPE is computed based on two secret data elements in the smart card, the key u installed in the smart card at the time of enrollment and the random number r generated at the time of each transaction. The secret random number is erased after each transaction, therefore a compromise of the unique key u, for example resulting from breaking of physical security of the smart card, does not compromise any PIN encryption key KPE used in any previous transactions.

The key management process can be described in three phases, pertaining to three aspects of the overall transaction system. One phase is enrolling of a smart card by a card issuer. A second phase is the usage of the smart card in facilitating security operations in an entity-initiated transaction, such as a customer-initiated transaction. A third phase includes operations of the card issuing host in processing a received transaction.

Figure 3:
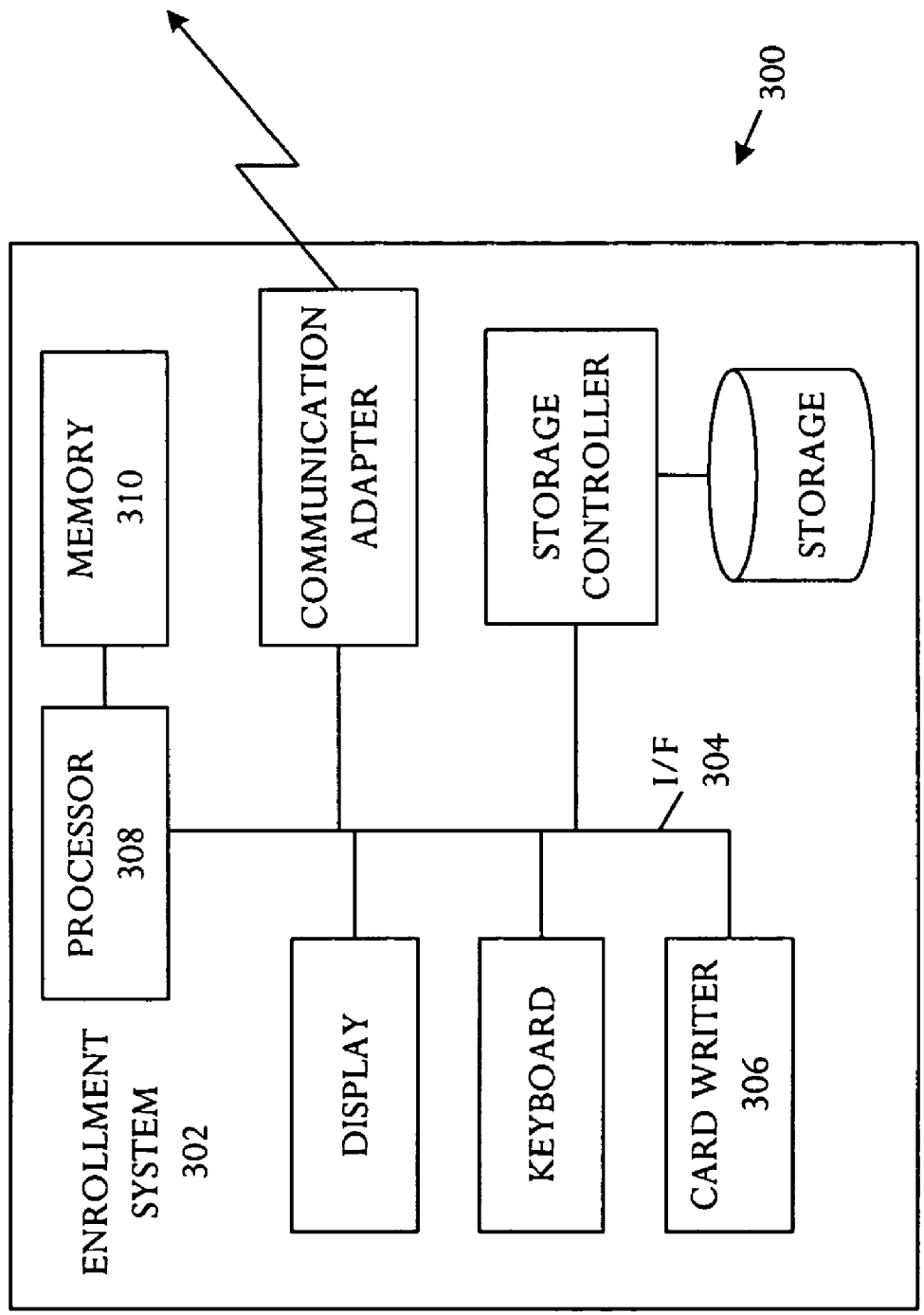
FIG. 3 is a schematic block diagram illustrating an embodiment of a data security apparatus including an enrollment system that enrolls a smart card for usage in initializing an end-to-end key management system.

Referring to FIG. 3, a schematic block diagram illustrates an embodiment of a data security apparatus 300 including an enrollment system 302 that enrolls a smart card for usage in initializing an end-to-end key management system. The enrollment system 302 comprises an interface 304 capable of communicating with a writer 306 configured to accept a smart card. The enrollment system 302 further comprises a processor 308 coupled to the interface 304 and a memory 310 coupled to the processor 312. The memory 310 contains computable readable program code that is capable of causing the processor 308 to initialize and personalize a smart card with a unique key per smart card. The unique key is derived from a private key that is assigned and distinctive to systems and a card base of a card issuer.

In various embodiments, the enrollment system 302 may have other components such as keyboards, displays, storage controllers, storage controllers, and the like. The enrollment system 302 may also have a communication adapter that is capable of communicating with various devices on a network such as remote and local hosts, servers, and systems.

The enrollment system 302 enrolls a smart card in an entity. In the illustrative embodiment, the entity can be a financial institution. In other embodiments, the entity can be any type of enterprise or organization that desires security for any type of transaction whether financial or otherwise. In various examples, the enrollment system 302 may be used in schools to protect information such as testing materials, scores, and records. The system can be used by governmental or military agencies to protect information. The system can be used by content providers such as video, audio, or information suppliers to protect data. The system may be used give security in many similar and dissimilar applications.

In some embodiments, the enrollment system 302 uses a global or system-wide RSA (Rivest, Shamir, and Adelman Public Key Cryptosystem) system that implements selected global or system-wide definitions of a public exponent e, a private exponent d, and a modulus N. The private exponent d is known exclusively by the enrollment system 302. The enrollment system 302 uses global or system-wide RSA system to create a unique key per smart card. The key is used in turn to create a unique key per transaction for every transaction originating at the smart card. The enrollment system 302 derives the unique key u from the RSA secret key d according to the equation:

$$u=x^d \bmod N,$$

where x is a Primary Account Number (PAN) or other unique number that identifies the smart card and/or the entity or consumer. The unique identifier x is public and the private exponent d is secret. Because the unique key u is derived from a secret value, the key u is secret. The enrollment system 302 stores the unique key u in the smart card along with the public unique identifier x.

Figure 4:
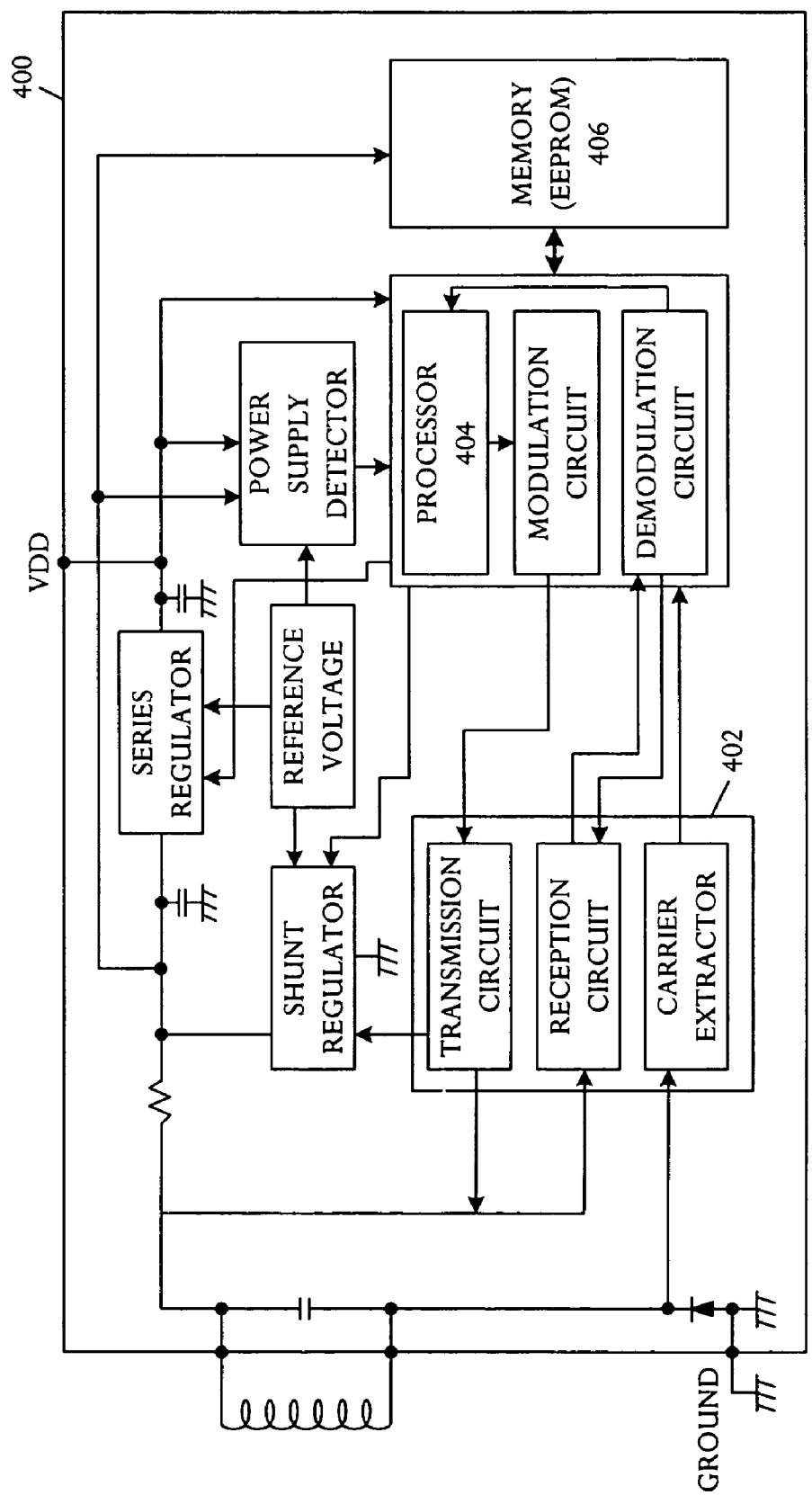
FIG. 4 is a schematic block diagram that illustrates an embodiment of a smart card that can be used in a data security apparatus to facilitate establishment of a secure channel through a network.

Referring to FIG. 4, a schematic block diagram illustrates an embodiment of a smart card 400 that can be used in a data security apparatus to facilitate establishment of a secure channel through an indeterminate number of nodes in a network. The smart card 400 comprises an interface 402 capable of communicating with a card reader and/or writer, a processor 404 coupled to the interface 402, and a memory 406. The memory 406 is coupled to the processor 404 and stores a public entity-identifier and a secret unique key. The secret unique key is derived from a private key that is assigned and distinctive to systems and a card base of a card issuer. The memory 406 further comprises a computable readable program code that creates a PIN encryption key derived from the smart card unique key and a transaction identifier that uniquely identifies the point of entry and transaction sequence number.

In the illustrative embodiment, the interface 402 includes a transmission circuit, reception circuit, and a carrier extractor. The processor 404 is contained within a controller that further includes a modulation circuit and a demodulation circuit. The processor 404 executes various functions including data processing, security, and multiple-read processing. The illustrative memory 406 is an Electrically-Erasable Programmable Read-Only Memory (EEPROM) that is programmed with the public entity-identifier and the secret unique key.

Several processes take place in the smart card 400 at the time of an online transaction. The smart card 400 may be used in various ways. A first optional mode of operation supplies end-to-end PIN encryption and can be configured to comply with conventional transaction procedures in financial networks except that the technique disclosed herein eliminates PIN translation at the intermediate nodes in the acquirer zone and the acquirer to switch zone.

In one example of the operation of the smart card 400, the smart card memory 406 stores the entity-identifier x and the unique key u. A customer enters the Personal Identification Number (PIN) into a customer-activated terminal. The terminal passes the PIN to the smart card 400. All financial transactions have a unique transaction identifier which identifies the terminal and contains a sequence number for each transaction originating at the terminal. The sequence number increments after each transaction. To facilitate auditing operations, the unique transaction sequence number TSN is sent along through the network with each transaction.

The smart card 400 computes key material K that the smart card uses to generate the PIN encryption key denoted by KPE using the equation:

$$K=u \cdot TSN^H \bmod N.$$

Keying material K is secret because unique key u is secret. Transaction Sequence Number TSN is public. The smart card 400 hashes keying material K to form a 112 bit triple-Data Encryption Standard (3-DES) or Advanced Encryption Standard (AES) key. The smart card 400 can pad the keying material K with transaction-related data prior to the hash operation. The PIN encryption key is termed KPE and is described as KPE=h(K). Encryption key KPE is secret because unique key u is secret and is used in the triple DES or AES algorithm to encrypt the PIN in the manner commonly used for PIN encryption in financial systems.

In a second optional operating mode, the KPE for encrypting the Personal Identification Number (PIN) is derived based on a random number r generated by the smart card rather than from the transaction sequence number TSN. The second option enables end-to-end encryption with forward perfect secrecy.

The smart card is enrolled or initialized in the same manner for both the first and second modes. In an on-line transaction according to the second mode, the smart card generates a random number r, which is a secret value and is used only for a particular transaction, generally only a single transaction. The smart card computes:

$$t = r^e \bmod N.$$

The smart card computes the hash H of the common public transaction data, then computes keying material K and the PIN encryption key KPE according to the equations:

$$K = u \cdot r^H \bmod N, \text{ and}$$

$$KPE = h(K).$$

The smart card erases the random number r after the transaction and sends the encrypted value $E_{KPE}[PIN]$ and value t through the network.

Figure 5:
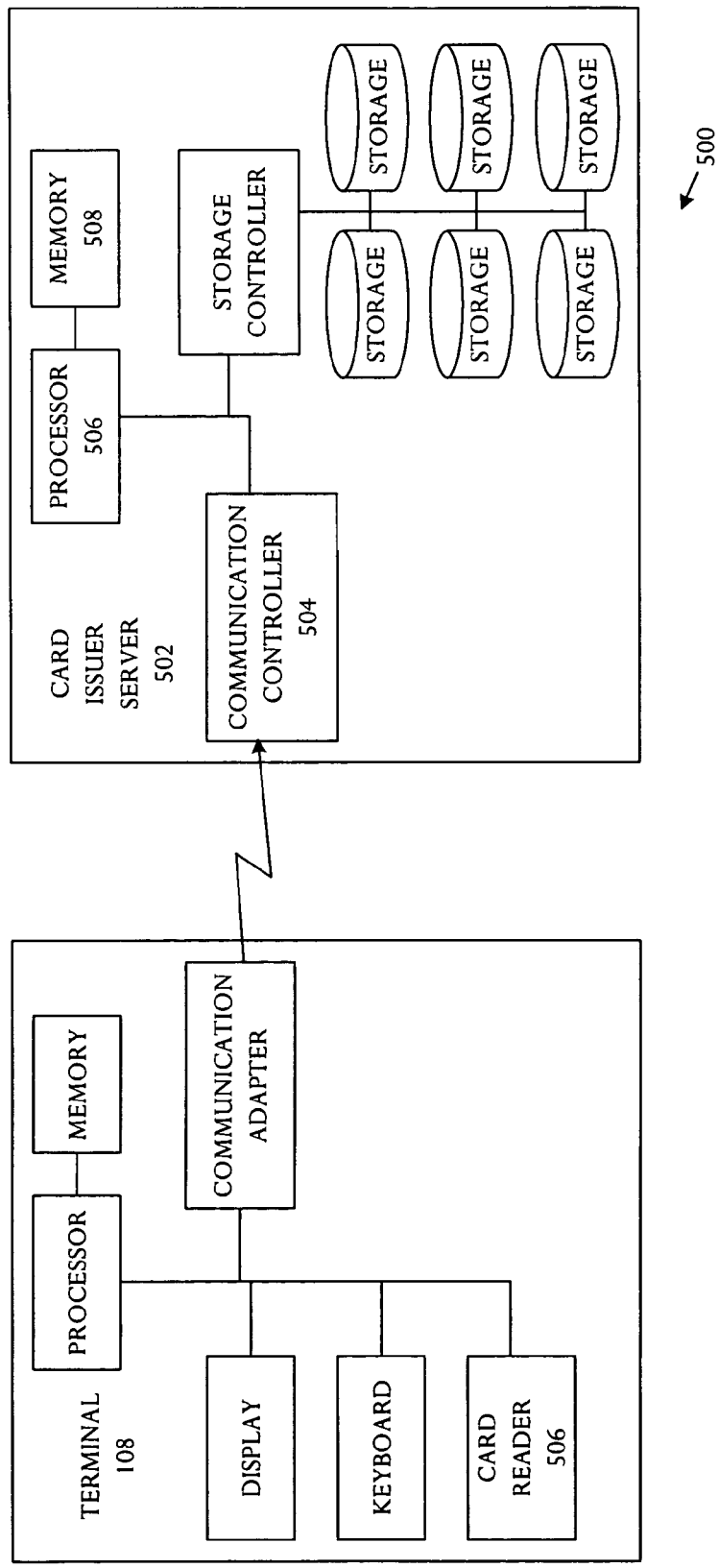
FIG. 5 is a schematic block diagram depicting an embodiment of a data security system that includes a card issuer server capable of usage in establishing a secure channel through a network.

Referring to FIG. 5, a schematic block diagram depicts an embodiment of a data security system 500 that includes a card issuer server 502 capable of usage for establishing a secure channel through an indeterminate number of nodes in a network. The card issuer server 502 comprises a communication interface 504 capable of communicating with the network, a processor 506 coupled to the communication interface 504, and a memory 508. The memory 508 is coupled to the processor 506 and contains a computable readable program code capable of causing the processor to recover a Personal Identification Number (PIN) from a transaction PIN encryption key received via the network using a card issuer private key. The transaction PIN encryption key is derived from a smart card unique key initialized and personalized to the smart card and derived from the card issuer private key, and a transaction identifier that uniquely identifies the point of entry and transaction sequence number.

In the first optional mode, the card issuer server 502 performs actions to complete a transaction on receipt of a PIN encryption key KPE and transaction data through the network. The card issuer server 502 computes the hash H of the transaction data, then computes the value:

$$t = TSN^e \bmod N.$$

The card issuer server 502 can perform the computation because the transaction sequence number TSN is transmitted along with the transaction data. The card issuer server 502 computes a cryptogram:

$$C = x \cdot t^H \bmod N,$$

using public data since entity-identifier x is part of the transaction and t is a public value in the form of the RSA encryption of the transaction sequence number (TSN), a public parameter. Any entity, including the card issuer server 502 or even an adversary, can compute the cryptogram, which corresponds to the equation $C = E_e[K]$, and describes the operation of encrypting keying material K using public RSA key e.

While the general public can construct the finished cryptogram, the general public cannot construct C through the process of encrypting keying material K using exponent e. Keying material K can only be recovered using the private exponent key d, a value accessible only by the card issuer server 502.

By virtue of possessing the private exponent d, the card issuer server 502 further can compute the keying material value K and PIN encryption key KPE according to equations:

$$K = C^d \bmod N, \text{ and}$$

$$KPE = h(K).$$

The card issuer server 502 uses the PIN encryption key KPE to decrypt the PIN. The PIN encryption keys KPE derived by the smart card and computed by the card issuer server 502 are the same. Usage of the same encryption key by the smart card and the server 502 enables end-to-end encryption with simultaneous integrity checking and authentication. Usage of the hash H of the transaction data by the smart card and the server further enables end-to-end encryption with simultaneous integrity checking and authentication. For example, hashing of an information element that is important or critical to a transaction ensures that the transaction data is not compromised during communication of the transaction.

In a specific example, a bank transaction may consist of the transfer of a particular monetary amount from a banking source to a banking destination. In the transaction, critical information elements are the identity of the banking source, identity of the banking destination, and the monetary amount. The smart card hashes the three information elements and initiates an end-to-end transfer that is processed by an issuer server. At the receiving end of the end-to-end transfer, the issuer source again hashes the critical information elements and expects the results to be the same as the hash performed by the smart card. If an adversary attacks the transaction, for example by changing the banking destination to the adversary's banking destination, the hash at the issuer server will not equate to the hash result of the smart card, so that the issuer server can avoid the result sought by the adversary. Accordingly, the illustrative system, in either the first or second operating modes, enables integrity checking and authentication.

In the second optional mode, the card issuer server 502 receives the PIN encryption value $E_{KPE}[PIN]$ and value t and performs several computations. The card issuer server 502 computes the hash H of the transaction data, then computes cryptogram C, keying material K, and PIN encryption key KPE according to the equations:

$$C = x \cdot t^H \bmod N,$$

$$K = C^d \bmod N, \text{ and}$$

$$KPE = h(K).$$

The two modes have several features. Both options perform end-to-end encryption with simultaneous transaction authentication.

The first mode is transparent to the network and improves security by enabling elimination of PIN translation—decryption and re-encryption—at intermediate nodes. In the first option, if unique key u is compromised or discovered, then security of previous transactions may be breached. With the unique key u known, any entity can compute value t.

In the second mode, operations are not transparent to the network because value t is transmitted as part of the transaction. The PIN encryption key KPE is computed based on two secret values in the smart card. The secret unique key u is installed in the smart card at the time of enrollment. The random number r is secret and generated for each transaction then erased. Because the secret value r is erased during each transaction, compromise of unique key u by breaking of physical security of the smart card does not compromise any previous transactions.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although particular equations with specific variable are disclosed to describe various operations, the operations performed can be described otherwise, either mathematically or non-mathematically. The operations, if described mathematically, can be modeled using other equations and/or variables. Furthermore, the disclosed examples describe data security operations in a financial system context. In other embodiments, the disclosed techniques and systems can be applied in various other data security settings.

What is claimed is:

1. A method for establishing a secure channel through an indeterminate number of nodes in a network comprising:
   enrolling a smart card with a unique key per smart card, the unique key derived from a private key that is assigned and distinctive to systems and a card base of a card issuer, an enrolled smart card containing a stored public entity-identifier and the unique key;
   transacting at a point of entry to the network, the transaction creating a PIN encryption key by hashing a keying code that is derived from the smart card unique key and a transaction identifier that uniquely identifies the point of entry and a transaction sequence number;
   communicating a PIN point-to-point in encrypted form through a plurality of nodes in the network; and
   recovering the PIN at a card issuer server using the PIN encryption key and the card issuer private key.

2. The method according to claim 1 further comprising:
   defining public key values (e, N) that are exclusive to a card issuer system and card base, the key value e being a public exponent and the key value N being a modulus in an RSA (Rivest, Shamir, and Adelman Public Key Cryptosystem) system;
   defining a private key value d that is exclusive to the card issuer system and card base, the private key value d being a secret RSA private key;
   computing a secret key u that is unique to the smart card using an equation of the form:

$u = x^d \pmod{N}$, where x is an entity-identifier that identifies the smart card and the entity; and
   storing the secret key u on the smart card with public key values x, e, and N.

3. The method according to claim 1 further comprising:
   receiving at an entity-activated terminal an entity-entered Personal Identification Number (PIN) and an entity-inserted smart card;
   passing the PIN to the smart card;
   computing at the smart card an equation of the form:

$K = u \cdot TSN^H \pmod{N}$, where K is a keying code, u is a secret key, TSN is a transaction sequence identifier that identifies the terminal and a sequence number for a transaction originating at the terminal, H is a hash of transaction data elements, and N is a modulus in an RSA (Rivest, Shamir, and Adelman Public Key Cryptosystem) system; and
   hashing at the smart card the keying code K to form the PIN encryption key KPE according to an equation of the form:

$KPE = h(K)$, where h( ) is a hashing algorithm.

4. The method according to claim 3 further comprising:
   hashing at the smart card the keying code K to form an encryption key according to an encryption definition selected from a triple Data Encryption Standard (3-DES) and an Advanced Encryption Standard (AES).

5. The method according to claim 3 further comprising:
   padding the keying code K with transaction-related data prior to the hash operation h(K).

6. The method according to claim 3 further comprising:
   deriving the PIN encryption key KPE uniquely as a function of the secret key u for each transaction.

7. The method according to claim 6 further comprising:
   maintaining the private key value d as a secret known only to the card issuer as the only entity capable of decrypting a cryptogram C.

8. The method according to claim 1 further comprising:
   receiving an encrypted PIN at a card issuer server;
   computing a hash H of transaction data;
   computing an RSA (Rivest, Shamir, and Adelman Public Key Cryptosystem) system encryption t of a transaction sequence identifier TSN that identifies a transaction terminal and a sequence number for a transaction originating at the terminal according to an equation of the form:

$TSN^e \pmod{N}$, where N is a modulus in an RSA system;
   computing a cryptogram quantity C using public data according to an equation of the form:

$C = x \cdot t^H \pmod{N}$, where x is an entity-identifier that identifies the smart card and the entity;
   decrypting the cryptogram quantity C using the private key value d that is exclusive to the card issuer system and card base, the private key value d being a secret RSA private key, the decryption according to an equation of the form:

$K = C^d \pmod{N}$; and decrypting the PIN using a PIN encryption key $KPE = h(K)$ where h( ) is a hashing algorithm.

9. The method according to claim 1 further comprising:
   encrypting the PIN at the smart card.

10. The method according to claim 1 further comprising:
    receiving at an entity-activated terminal an entity-entered Personal Identification Number (PIN) and an entity-inserted smart card;

passing the PIN to the smart card;
generating a random number r at the smart card that is unique to a transaction;
computing at the smart card an RSA (Rivest, Shamir, and Adelman Public Key Cryptosystem) system encryption t according to an equation of the form $t = r^e \pmod{N}$, where e is the public exponent and N the modulus of the RSA system;
computing at the smart card a hash H of common public transaction data;
computing at the smart card a keying code K and a PIN encryption key KPE according to equations of the form:

$K = u \cdot r^H \pmod{N}$, and $KPE = h(K)$, where u is a secret key and H is a hash of transaction data elements;
sending the PIN encryption key KPE and RSA system encryption t through the network; and
erasing the random number r.

11. The method according to claim 10 further comprising:
receiving a PIN encryption key KPE and encryption t at a card issuer server;
computing a hash H of transaction data;
computing a cryptogram quantity C using public data according to an equation of the form:

$C = x \cdot t^H \pmod{N}$, where x is an entity-identifier that identifies the smart card and the entity;
decrypting the cryptogram quantity C using the private key value d that is exclusive to the card issuer system and card base, the private key value d being a secret RSA private key, the decryption according to an equation of the form:

$K = C^d \pmod{N}$; and decrypting the PIN using the PIN encryption key KPE=h(K) where h( ) is a hashing algorithm.

12. The method according to claim 1 further comprising:
computing at the smart card a hash H of transaction data;
communicating the transaction data hash to a card issuer server;
computing at the card issuer server a hash of transaction data; and
verifying the communicated hash with the server-computed hash for authentication and integrity checking.

13. A data security apparatus comprising:
a smart card that establishes a secure channel through an indeterminate number of nodes in a network comprising:
an interface for communicating with a card reader and/or writer;
a processor coupled to the interface; and
a memory coupled to the processor that stores a public entity-identifier and a secret unique key derived from a private key that is assigned and distinctive to systems and a card base of a card issuer, the memory further comprising:
a computable readable program code embodied therein that creates a PIN encryption key derived from the smart card unique key and a transaction identifier that uniquely identifies a point of entry and transaction sequence number;
a computable readable program code causing the processor to receive an entity-entered Personal Identification Number (PIN);
a computable readable program code causing the processor to compute an equation of the form:

$K = u \cdot TSN^H \pmod{N}$, where K is a keying code, u is a secret key, TSN is a transaction sequence identifier that identifies the point of entry and a sequence number for a transaction originating at the terminal, H is a hash of transaction data elements, and N is a modulus in an RSA (Rivest, Shamir, and Adelman Public Key Cryptosystem) system; and
a computable readable program code causing the processor to hash the keying code K to form the PIN encryption key KPE according to an equation of the form:

$KPE = h(k)$, where h( ) is a hashing algorithm.

14. The apparatus according to claim 13 further comprising:
a secret unique key u stored in the memory with public key values x, e, and N where x is an entity-identifier that identifies the smart card and the entity, key value e is a public exponent and key value N is a modulus in an RSA (Rivest, Shamir, and Adelman Public Key Cryptosystem) system, the public key values (e, N) being exclusive to a card issuer system and card base;
wherein the secret key u is unique to the smart card and computed using an equation of the form:

$u = x^d \pmod{N}$, where a private key value d is exclusive to the card issuer system and card base, the private key value d being a secret RSA private key.

15. The apparatus according to claim 13 wherein the memory further comprises:
a computable readable program code causing the processor to hash the keying code K to form an encryption key according to an encryption definition selected from a triple Data Encryption Standard (3-DES) and an Advanced Encryption Standard (AES).

16. The apparatus according to claim 13 wherein the memory further comprises:
a computable readable program code causing the processor to pad the keying code K with transaction-related data prior to the hash operation h(K).

17. The apparatus according to claim 13 wherein the memory further comprises:
a computable readable program code causing the processor to hash transaction data elements and communicate the hash point-to-point to a card issuer enabling simultaneous key management and integrity checking.

18. A data security apparatus comprising:
an enrollment system that establishes a secure channel through an indeterminate number of nodes in a network, the enrollment system comprising:
a communication interface for communicating with a writer configured to accept a smart card;
a processor coupled to the communication interface; and
a memory coupled to the processor and having a computable readable program code embodied therein causing the processor to initialize and personalize the smart card with a unique key per smart card, the unique key derived from a private key that is assigned and distinctive to systems and a card base of a card issuer, the unique key for usage by the smart card to create a PIN encryption key computed by an equation of the form $K = u \cdot TSN^H (\bmod N)$, where K is a keying code, u is a secret key, TSN is a transaction sequence identifier that identifies a terminal and a sequence number for a transaction originating at the terminal, H is a hash of transaction data elements, and N is a modulus in an RSA (Rivest, Shamir, and Adelman Public Key Cryptosystem) system; and the smart card hashes the keying code K to form the PIN encryption key KPE according to an equation of the form:

$KPE = h(k)$, where h( ) is a hashing algorithm.

19. The apparatus according to claim 18 wherein the memory further comprises:
a computable readable program code causing the processor to write to an enrolled smart card a stored public entity-identifier and the secret unique key.

20. The apparatus according to claim 18 wherein the memory further comprises:
a computable readable program code causing the processor to define public key values (e, N) that are exclusive to the card issuer system and card base, the key value e being a public exponent and the key value N being a modulus in an RSA (Rivest, Shamir, and Adelman Public Key Cryptosystem) system;
a computable readable program code causing the processor to define a private key value d that is exclusive to the card issuer system and card base, the private key value d being a secret RSA private key;
a computable readable program code causing the processor to compute a secret key u that is unique to the smart card using an equation of the form:

$u = x^d (\bmod N)$, where x is an entity-identifier that identifies the smart card and the entity; and
a computable readable program code causing the processor to store the secret key u on the smart card with public key values x, e, and N.

21. A data security apparatus comprising:
a card issuer server that establishes a secure channel through an indeterminate number of nodes in a network, the card issuer server comprising:
a communication interface for communicating with the network;
a processor coupled to the communication interface; and
a memory coupled to the processor and having a computable readable program code embodied therein causing the processor to recover a Personal Identification Number (PIN) from an encrypted PIN received via the network using a card issuer private key and a transaction PIN encryption key, the transaction PIN encryption key created by hashing a keying code that is derived from a smart card unique key initialized and personalized to the smart card and derived from the card issuer private key, and a transaction identifier that uniquely identifies a point of entry and a transaction sequence number.

22. The apparatus according to claim 21 wherein:
the smart card unique key is a secret key u that is unique to the smart card and is computed by a card enrollment system using an equation of the form:

$u = x^d (\bmod N)$, where x is an entity-identifier that identifies the smart card and the entity; a private key value d is a secret RSA private key, and key value N is a modulus in an RSA (Rivest, Shamir, and Adelman Public Key Cryptosystem) system, the key values d and N being exclusive to a card issuer system and card base.

23. The apparatus according to claim 21 wherein the memory further comprises:
a computable readable program code causing the processor to receive a PIN encryption key KPE at a card enrollment server;
a computable readable program code causing the processor to compute a hash H of transaction data;
a computable readable program code causing the processor to compute an RSA (Rivest, Shamir, and Adelman Public Key Cryptosystem) system encryption t of a transaction sequence identifier TSN that identifies a transaction terminal and a sequence number for a transaction originating at the terminal according to an equation of the form:

$t = TSN^e (\bmod N)$, where N is a modulus in an RSA system;
a computable readable program code causing the processor to compute a cryptogram quantity C using public data according to an equation of the form:

$C = x \cdot t^H (\bmod N)$, where x is an entity-identifier that identifies the smart card and the entity;
a computable readable program code causing the processor to decrypt the cryptogram quantity C using the private key value d that is exclusive to the card issuer system and card base, the private key value d being a secret RSA private key, the decryption according to an equation of the form:

$K = C^d (\bmod N)$; and a computable readable program code causing the processor to decrypt the PIN using the PIN encryption key $KPE = h(K)$ where h( ) is a hashing algorithm.

24. The apparatus according to claim 21 wherein the memory further comprises:
a computable readable program code causing the processor to receive a PIN encryption key KPE and encryption t;
a computable readable program code causing the processor to compute a hash H of transaction data;
a computable readable program code causing the processor to compute a cryptogram quantity C using public data according to an equation of the form:

$C = x \cdot t^H (\bmod N)$, where x is an entity-identifier that identifies the smart card and the entity;
a computable readable program code causing the processor to decrypt the cryptogram quantity C using the private key value d that is exclusive to the card issuer system and card base, the private key value d being a secret RSA private key, the decryption according to an equation of the form:

$$K=C^d(\bmod N);\text{ and}$$

a computable readable program code causing the processor to decrypt the PIN using the PIN encryption key KPE=h(K) where h( ) is a hashing algorithm.

25. The apparatus according to claim 21 wherein the memory further comprises:
a computable readable program code causing the processor to hash transaction data elements and compare the hash to a hash received point-to-point from a smart card enabling simultaneous key management and integrity checking.

26. A transaction system comprising:
a network;
a plurality of servers and/or hosts mutually coupling to the network;
a plurality of terminals coupled to the servers and/or hosts via the network and available for transacting;
a plurality of smart cards enrolled in the transaction system and adapted for insertion into the terminals and transacting via the servers and/or hosts; and
a plurality of processors distributed among the smart cards, the servers and/or hosts, and/or the terminals, at least one of the processors establishing a secure channel through an indeterminate number of nodes in the network by communicating, and decrypting a PIN encrypted using a PIN encryption key created by hashing a keying code that is derived from a smart card unique key and a transaction identifier that uniquely identifies a point of entry terminal and a transaction sequence number, the smart card unique key being derived from a private key that is assigned and distinctive to systems and a card base of a card issuer.

27. A transaction system comprising:
a network;
a plurality of servers and/or hosts mutually coupling to the network;
a plurality of terminals coupled to the servers and/or hosts via the network and available for transacting;
a plurality of smart cards enrolled in the transaction system and adapted for insertion into the terminals and transacting via the servers and/or hosts; and
a plurality of processors distributed among the smart cards, the servers and/or hosts, and/or the terminals, at least one of the processors establishing a secure channel through an indeterminate number of nodes in the network by communicating, and decrypting a PIN encrypted using a PIN encryption key creating by hashing a keying code that is derived from a smart card unique key and a hash of transaction data elements.

28. A transaction system establishing a secure channel through an indeterminate number of nodes in a network comprising:
means for enrolling a smart card with a unique key per smart card, the unique key being derived from a private key that is assigned and distinctive to systems and a card base of a card issuer, an enrolled smart card containing a stored public entity-identifier and the unique key;
means for transacting at a point of entry to the network, the transaction creating a PIN encryption key by hashing a keying code that is derived from the smart card unique key and a transaction identifier that uniquely identifies the point of entry and a transaction sequence number;
means for communicating a PIN point-to-point in encrypted form through a plurality of nodes in the network; and
means for recovering the PIN at a card issuer server using the PIN encryption key and the card issuer private key.

* * * * *

UNITED STATES PATENT AND TRADEMARK OFFICE
CERTIFICATE OF CORRECTION

| | | |
|---|---|---|
| PATENT NO. | : 7,512,800 B2 | Page 1 of 1 |
| APPLICATION NO. | : 10/772065 | |
| DATED | : March 31, 2009 | |
| INVENTOR(S) | : W. Dale Hopkins | |

It is certified that error appears in the above-identified patent and that said Letters Patent is hereby corrected as shown below:

In column 12, line 45, in Claim 8, delete "$TSN^e$" and insert -- $t=TSN^e$ --, therefor.

Signed and Sealed this

Eleventh Day of August, 2009

David J. Kappos
*Director of the United States Patent and Trademark Office*